United States Patent [19]

Descoteaux et al.

[11] 4,068,534

[45] Jan. 17, 1978

[54] VERTICAL LIFT ASSEMBLY

[76] Inventors: Claude Descoteaux; Chester Wenzel, both of 15555 E. 12 Mile Road, Roseville, Mich. 48066

[21] Appl. No.: 728,276

[22] Filed: Sept. 30, 1976

[51] Int. Cl.[2] .............................................. F16H 21/02

[52] U.S. Cl. .......................................... 74/27; 74/422; 74/29

[58] Field of Search .............................. 74/29, 27, 422

[56] References Cited

U.S. PATENT DOCUMENTS

| | | | |
|---|---|---|---|
| 2,901,942 | 9/1959 | Tackaberry | 74/29 |
| 3,665,771 | 5/1972 | Blatt | 74/29 |

*Primary Examiner*—Benjamin W. Wyche
*Assistant Examiner*—Wesley S. Ratliff, Jr.
*Attorney, Agent, or Firm*—Cullen, Settle, Sloman & Cantor

[57] ABSTRACT

A vertical lift assembly includes a framework having top, bottom, side and back plates. An upright air cylinder is mounted upon the framework and includes a reciprocal piston rod supporting a lift arm at one end and parallel to the bottom plate. A pair of upright guide rods extend between the top and bottom plates. A vertically reciprocal carriage is mounted upon said guide rods and is adapted to support a horizontally disposed workpiece gripper. An upright movable rack gear is mounted upon the carriage and an upright stationary rack gear is spaced therefrom and mounted upon said framework. A vertically reciprocal carrier includes a series of vertically spaced pinions which are in meshing engagement with said stationary rack gear and with at least a pair of said pinions at all times in meshing engagement with both of said rack gears. The other end of the lift arm is secured to the carrier whereby reciprocal movements of the piston rod and lift arm effect corresponding movements of said carrier and corresponding raising and lowering movements of said carriage.

9 Claims, 3 Drawing Figures

VERTICAL LIFT ASSEMBLY

BACKGROUND OF THE INVENTION

It is known in the art to employ rack gears and pinions for effecting longitudinal movements and further to provide a reciprocal carrier which moves between a pair of opposed rack gears with one rack gear being stationary and the other being mounted upon a movable carriage, for effecting longitudinal movements of said carriage. One example of such device is shown in U.S. Pat. No. 3,665,771 of May 30, 1972.

SUMMARY OF THE INVENTION

It is an object of the present invention to incorporate the use of movable pinions in conjunction with stationary and movable rack gears so as to provide a vertical lift assembly which is adapted for mounting a workpiece gripper and for effecting raising and lowering movements of a workpiece with respect to a machine tool.

It is an object of the present invention to provide a vertical lift assembly which includes a guidably mounted carriage movable within a framework and having thereon a horizontally disposed workpiece gripper on one side and upon its opposite side a movable rack gear whereby a vertically reciprocal carrier mounting a series of pinions in mesh with said carriage rack gear, and also in mesh with a stationary rack gear will effect reciprocal raising and lowering movements of such carriage.

These and other objects will be seen from the following specification and Claims in conjunction with the appended drawings.

THE DRAWINGS

DETAILED DESCRIPTION OF THE INVENTION

Figure 1:
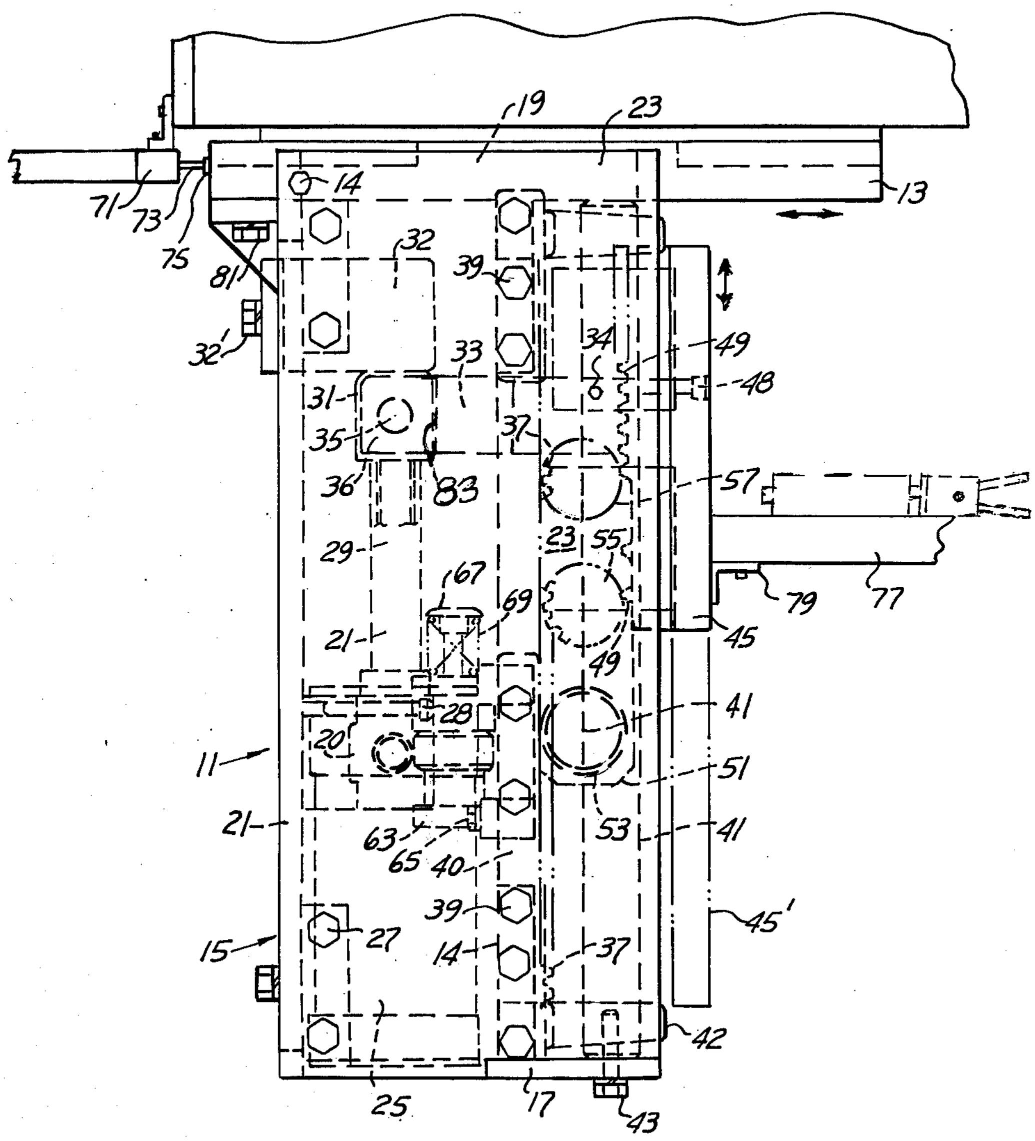
FIG. 1 is a side elevational view of the present vertical lift assembly.

Referring to the drawings: 1, 2 and 3, the present vertical lift assembly, generally indicated at 11, underlies and is suitably secured to the horizontal feed support 13 and includes framework 15. Said framework includes bottom plate 17, top plate 19, back plate 21 and the side plates 23 and 26, FIG. 2.

Air cylinder 25 is mounted upon said bottom plate and secured thereto by fasteners 27 and includes the upright reciprocal piston rod 29 projecting therefrom.

Knuckle block 31 upon the upper end of said piston rod mounts the transverse connector pin 35 at its ends carrying the pair of spaced trunion blocks 36. Connected to said trunion blocks respectively are a pair of laterally extending lift arm plates 33 which extend parallel to bottom plate 17 towards the open side of the framework. The opposite ends of the plates 33 are secured as at 34 to the vertically adjustable pinion carrier 51, FIG. 2, hereafter described.

Figure 2:
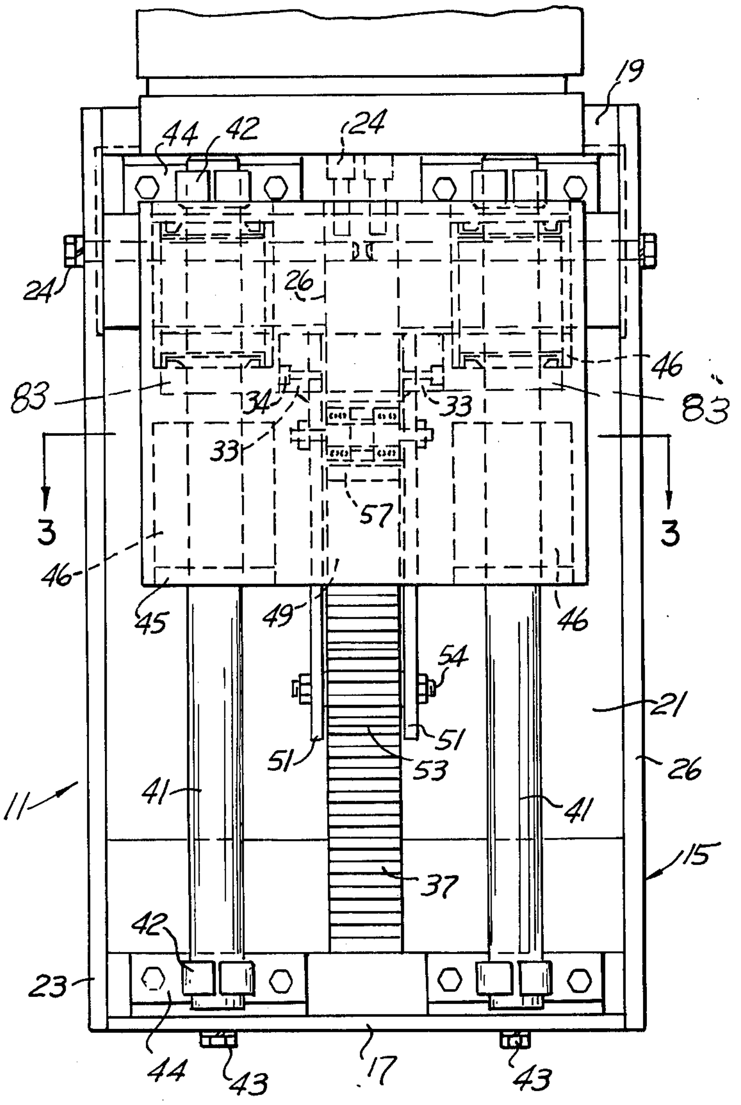
FIG. 2 is a right side elevational view thereof.

An upright stationary rack gear 37 is mounted upon said framework intermediate its side plates 23 and 26, FIG. 2, and is secured to said framework by the opposed pair of upright rack mounting plates 40 which extend between the top and bottom plates and in between the side plates 23 and 26. The rack mounting plates 40 are secured to said side plates by fasteners 39.

Figure 3:
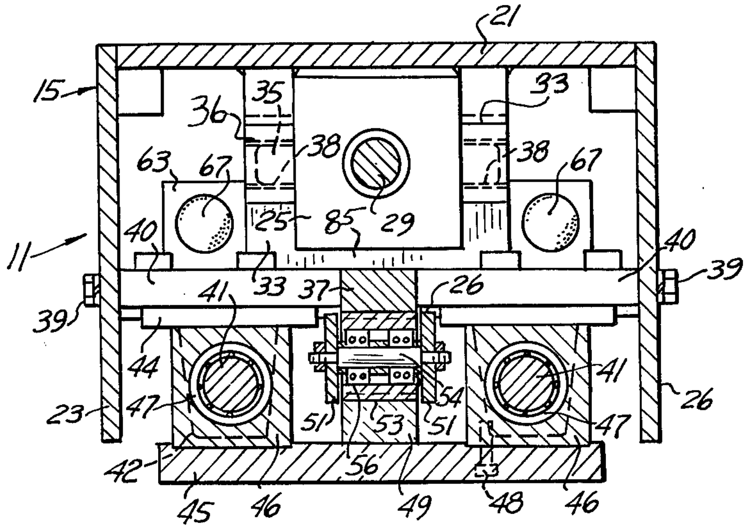
FIG. 3 is a fragmentary section taken in the direction of arrows 3—3 of FIG. 2.

Mounted within said framework outwardly of the rack gear 37 are a pair of upright laterally spaced guide rods 41. These rods extend between the top and bottom plates and are axially secured thereto by the fasteners 43. Additional shaft support plates 44 extend between the top and bottom plates and are suitably anchored within the framework. Said shaft support plates include the laterally extending brackets 42 which are arranged adjacent the top and bottom of said framework and engage and are secured to upper and lower portions of said guide rods as best shown in FIG. 2. The vertically adjustable lift carriage 45, FIGS. 1 and 3, mount vertically spaced pairs of bearing blocks or guide blocks 46 secured thereto by fasteners 48 and which include a series of internal ball bushings 47 adapted to receive the respective upright guide rods 41. The bearing blocks thus stablize the vertically adjustable carriage with respect to the framework and particularly said guide rods during vertical adjustments thereof. Mounted upon the interior surface of the vertically adjustable carriage 45 is an upright rack gear 49 which is spaced from and opposed to the stationary rack gear 37 as best illustrated in FIG. 3.

A vertically adjustable pinion carriage including a pair of opposed upright side plates 51 is movably interposed between said rack gears. Said pinion carrier includes between its side plates 51 a plurality of vertically spaced pinions such as the pinions 53, 55 and 57 which are spaced from each other and are mounted upon the transverse pinion support shafts 54 with suitable parallel spaced bearings 56 interposed.

The outer ends of the lift arm plates 33 extend to the respective side plates 51 and are secured thereto by the fasteners 34 shown in FIG. 2, and welded thereto.

Accordingly the pinion carrier 51 is mounted between the upright stationary rack gear 37 and the vertically adjustable movable rack gear 49 upon the vertical lift carriage 45. The pinion carrier 51 is constrained to vertical movements between said rack gears by virtue of its attachment to the respective lift arms 33 connected to the reciprocal piston rod 29.

As shown in FIGS. 1 and 3, a pair of laterally spaced shock absorbers 63 are mounted within the framework and secured as at 65, FIG. 1, to the rack gear support plates 40. Such shock absorbers at their upper ends have vertically yieldable bumpers 67 and interposed spring 69, and underly the respective lift arm plates 33. Such shock absorbers are adapted to yieldably engage said pinion carrier lift support plates upon downward movement thereof to their lower most positions. Plates 33 have lateral extensions 83 which overlie bumpers 67.

As above described and as shown in FIG. 1, there is an adjustable stop 32 mounted upon the framework and secured thereto as by the fastener 32' adapted for engaging registry with the piston rod knuckle block 31 in order to limit upward movement thereof. Trunnion blocks 36 are at the rear ends of lift arm plates 33 as a part thereof. The lift arm plates are centrally interconnected at 85, FIG. 3.

There is fragmentarily shown in FIG. 1 a horizontally disposed tool support 77 which at one end is mounted as at 79 to the outer face of the vertically adjustable lift carriage 45. Said tool support plate 77 is adapted to mount a suitable workpiece gripper mechanism which is adapted for projection outwardly of the support 77 for gripping and/or releasing a workpiece from a press or other machine tool.

As above described, while the present framework for the vertical lift assembly provides a means for vertical lift adjustment of the tool support carriage 45 and the support plate 77, there is provision also for effecting longitudinal feed movements of the entire framework 15. For this purpose and as above mentioned, there is an overlying horizontally adjustable feed support 13, FIGS. 1 and 2, which is suitably secured to the framework, top plate and side plates as by the clamps or fasteners 81 as shown in FIG. 1. The horizontal support is capable of longitudinal reciprocal movements by some exterior mechanism such as by the power cylinder 71, fragmentarily shown, whose reciprocal piston rod 73 is secured as at 75 to the horizontal feed support 13. It is contemplated that any of a number of forms of longitudinal feed control may be employed for effecting corresponding longitudinal movements of the entire lift assembly framework.

Having described my invention, reference should now be had to the following claims.

I claim:

1. A vertical lift assembly comprising a framework including top and bottom plates, side plates and a back plate, and open at the front;
- an upright air cylinder on said bottom plate bearing against and secured to said back plate; and
- including a reciprocal piston rod projecting from said cylinder;
- a lift arm at one end secured to the upper end of said piston rod and parallel to said bottom plate;
- a pair of spaced upright guide rods extending between said top and bottom plates and secured to said framework;
- a vertically reciprocal carriage mounting a pair of bearing blocks with internal bushings guidably mounted upon said guide rods, and adapted to mount a horizontally disposed workpiece gripper;
- an upright movable rack gear mounted upon the interior of said carriage;
- an upright stationary rack gear opposed to and spaced from said movable rack gear interposed between said top and bottom plates and secured to said framework;
- a vertically reciprocal carrier having a pair of opposed upright side plates; and
- a series of vertically spaced pinions journalled upon said carrier between said side plates, in meshing engagement with said stationary rack gear;
- at least one pair of pinions at all times being in meshing engagement with both of said rack gears;
- the other end of said lift arm being secured to said carrier, whereby reciprocal movements of said piston rod and lift arm effect corresponding movements of said carrier, in turn, effecting corresponding raising and lowering movements of said carriage.

2. In the vertical lift assembly of claim 1, the securing of said lift arm to said piston rod including a knuckle block upon said piston rod;
- a transverse pin extending through said knuckle block;
- a pair of spaced trunion blocks upon opposite ends of said pin;
- said arm including a pair of spaced plates at their one ends secured to said trunion blocks, their other ends being secured to said pinion carrier, for vertical reciprocal movements in unison.

3. In the vertical lift assembly of claim 1, a shock absorber mounted on said framework below said lift arm for receiving and cushioning said lift arm as it moves to its lower most position; and an adjustable stop on said framework above said piston rod to limit upward movements of said piston rod.

4. In the vertical lift assembly of claim 2, a pair of spaced shock absorbers mounted on said framework spaced below said lift arm plate for receiving and cushioning said lift arm plates as they move to their lowermost position; and an adjustable stop on said framework above said piston rod to limit upward movements of said piston rod.

5. In the vertical lift assembly of claim 1, the securing of said guide rods including vertically spaced shaft support plates mounted on said framework adjacent the top and bottom plates; brackets extending from said support plates receiving and retainingly engaging upper and lower ends of said guide rods respectively; and fasteners on said top and bottom plates extending axially into the upper and lower ends of said guide rods.

6. In the vertical lift assembly of claim 1, a horizontal feed support overlying said framework and secured to said top plate and side plates for effecting reciprocal horizontal movements of said framework.

7. In the vertical lift assembly of claim 1, an additional pair of spaced bearing blocks in said carriage with internal bushings slidably mounted on said guide rods stablizing vertical movements of said carriage.

8. In the vertical lift assembly of claim 1, a horizontally disposed workpiece gripper support plate mounted on said carriage and secured thereto.

9. In the vertical lift assembly of claim 1, the mounting of said pinions upon said carrier including a series of vertically spaced pinion support shafts spanning and secured to said side plates; and a pair of spaced bearings on each shaft within and coaxial of said pinions respectively; at least a pair of said pinions being in mesh with said movable rack gear.

* * * * *